June 16, 1931.  F. E. AUSTIN  1,810,745
EDUCATIONAL APPARATUS
Filed June 21, 1929
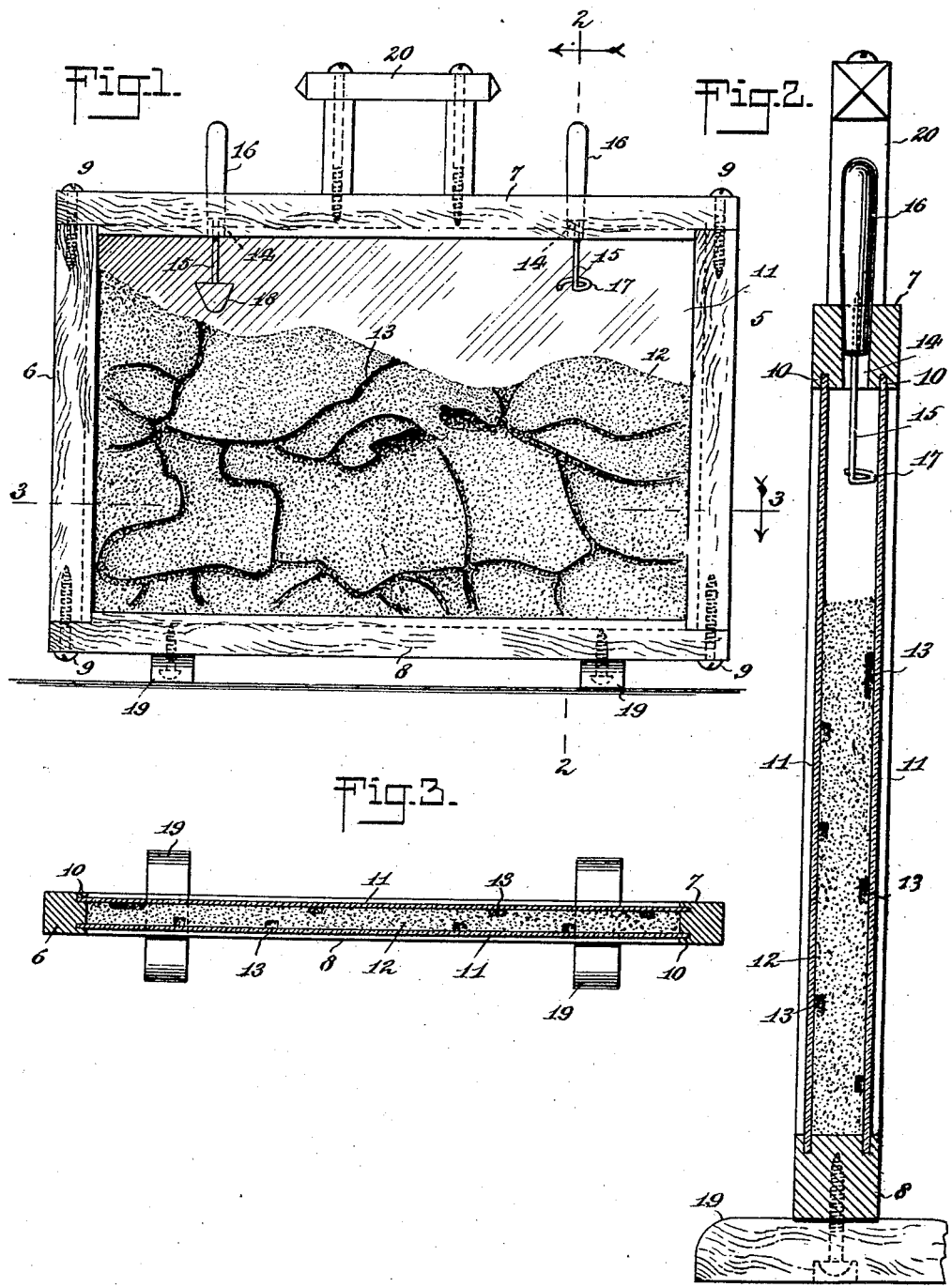
WITNESSES
William P. Goebel
Huey L. H. Ott
INVENTOR
F. E. Austin
BY
ATTORNEY Patented June 16, 1931

1,810,745

UNITED STATES PATENT OFFICE

FRANK EUGENE AUSTIN, OF HANOVER, NEW HAMPSHIRE

EDUCATIONAL APPARATUS

Application filed June 21, 1929. Serial No. 372,703.

This invention relates to educational devices, and has particular reference to an apparatus for facilitating the observation, study and photography of subterranean life, especially the life and habits of insects and smaller animals who live underground.

The invention primarily comprehends a case or enclosure containing a quantity of earth, sand or other substance which serves as the natural habitat of the form of life which it is desired to observe, study or photograph, together with said form of life, and which case or enclosure is provided with a transparent panel or portion through which the observations or photographs may be made.

The invention further comprehends in an apparatus of the character set forth, means for introducing to the interior of the enclosure sustenance for the form of life contained therein, which means additionally serves to close the openings by virtue of which the introduction of the sustenance is obtained.

Other objects of the invention reside in the simplicity of construction and mode of use of the device, the economy with which it may be produced and the general efficiency derived therefrom.

With the above recited and other objects in view, reference is had to the following description and accompanying drawings, in which there is exhibited one example or embodiment of the invention, while the claim defines the actual scope of the same.

In the drawings—

Figure 1 is a side view of a case constructed in accordance with the invention.

Figure 2 is an enlarged vertical sectional view therethrough taken approximately on the line 2—2 of Figure 1.

Figure 3 is a horizontal sectional plan view therethrough taken approximately on the line 3—3 of Figure 1.

Referring to the drawings by characters of reference, the case or enclosure is composed of a frame constructed of vertical stiles 5 and 6 and horizontal upper and lower stiles 7 and 8 which are joined together in any suitable manner, such as by means of screws or other fastening elements 9, to complete a substantially rectangular frame. The inner faces of the stiles are formed with transversely spaced complementary grooves 10 to receive the spaced parallel panels 11, one or both of which panels are constructed of a transparent material, preferably glass or its equivalent. Within the enclosure defined by the frame and the panels, a quantity of earth, sand or other substance 12 is contained, which substance forms the natural habitat of the insects, animals or other form of subterranean life which is to be observed, studied or photographed. It is also understood that the desired number of insects, animals or other forms of subterranean life are introduced into the enclosure so that their burrows, tunnels, passageways, caverns or the like illustrated at 13 may reveal through the transparent panel or panels 11, the habits and actions thereof. In order to provide means for introducing sustenance, such as water and food, to the insects or animals, the upper stile 7 is provided with an aperture or apertures 14. Instruments which are designed for the purpose of holding and introducing the sustenance are provided, and said instruments consist of a shank 15 having a handle 16 which snugly fits the aperture 14 and supports the depending shank 15 therefrom. The shank 15 may be provided with a loop 17 at its lower end for holding the food thereon or with a cup 18 adapted to contain water. The handles 16 in addition to performing their function of a handle and for supporting the shanks 15 of the instrument, also constitute stoppers for closing the apertures 14 to prevent the escape of the insects or animals from the enclosure.

In practice, the lower stile 8 may have attached thereto transversely disposed supporting feet 19 while the upper stile 7 may be provided with a handle 20 for lifting, carrying and transporting the case.

What is claimed is:

An apparatus of the class described comprising a case having a glass side and containing soil and ants, the tunnels and rooms made by the ants being exposed through the glass side, there being an aperture in the case, an elongated handle for closing the aperture, and a shank extending inwardly from the handle and providing means for supporting sustenance for the ants.

FRANK EUGENE AUSTIN.